United States Patent Office 3,166,442
Patented Jan. 19, 1965

3,166,442
METHOD FOR TREATING SUGAR LIQUOR
James B. Duke, Metuchen, N.J., assignor to Minerals & Chemicals Philipp Corporation, Menlo Park, N.J., a corporation of Maryland
No Drawing. Filed May 23, 1963, Ser. No. 282,583
15 Claims. (Cl. 127—48)

This invention relates to the purification of sugar and is directed especially to improvements in the clarification of defecated sugar liquors.

Raw sugar is an impure material that must undergo extensive treatment to put it in a condition suitable for consumption. Initially the raw sugar crystals undergo a washing step (affination) to remove adherent molasses. The raw washed sugar contains appreciable quantities of insoluble particles (such as sand and bagacillo), colloids (such as gums and pectins) and also soluble and suspended coloring material. In order to render the raw sugar liquor suitable for filtration or clarification to remove insolubles and suspended particles, the liquor must undergo a preliminary treatment called "defecation." The treatment entails the formation in a concentrated aqueous sugar solution (liquor) of a flocculent precipitate which occludes colloids and matter suspended in the liquor. In a preferred method of defecation, the defecating materials are phosphoric acid and lime which interact to form in situ a flocculent calcium phosphate precipitate. The lime-phosphoric acid defecated liquors are not amenable to pressure filtration and are clarified without filtration by any one of several modifications of the so-called "Williamson" clarification system. This type of clarification involves impregnating fine air bubbles into the sugar liquor which is heated to reduce its viscosity. The air impregnated liquor, heated to a temperature below which sugar inversion will take place, is maintained quiescent. Under these conditions, the air bubbles in the liquor rise to the surface of the liquor carrying the flocculent calcium phosphate precipitate together with occluded insolubles and nonsugar materials in the liquor. The scum is withdrawn from the clarified liquor by mechanical means. In effect, clarification of the defecated liquor is effected by scum flotation and air bubbles are employed to levitate precipitated material with occluded impurities originally in the raw sugar.

In order to impregnate the defecated liquor with a sufficient quantity of finely divided air bubbles to achieve satisfactory clarification, it has been considered necessary to employ complex nozzle ejector systems. These systems tend to clog and, when clogged, the liquor is not properly aerated and insufficient clarification results.

Clarification of the lime-phosphoric acid defecated raw sugar liquor by the scum flotation technique of the prior art can bring about a significant reduction in the turbidity of the liquor. The scum flotation also removes some coloring matter from the liquor. However, the liquor clarified by scum flotation still is dark in color and, further, it contains appreciable suspended matter which would quickly clog the pores and foul the adsorbent that is employed to decolorize the liquor after the liquor is clarified. Therefore, before the clarified liquor can be filtered through a char or other adsorbent to remove colored matter, the liquor is filtered with a filter aid, usually a diatomaceous filter aid. This filtration step is frequently referred to as a "polishing." Polishing, however, has little effect on the color of the clarified liquor and the color of the polished clarified liquor does not differ appreciably from the color of the liquor before clarification and polishing. Therefore, clarification and polishing as presently practiced in sugar refineries does not reduce signficantly the amount of color material that must be adsorbed by the decolorizing adsorbent. Since the cost of the decolorizing adsorbents employed in the sugar refining industry constitutes a major expense in the refining process, a reduction in the amount of color matter in the liquor charged to the decolorizing adsorbent would represent a marked improvement in the overall economies of the refining operation.

Accordingly, an object of this invention is to provide improvements in the method for clarfying defecated sugar liquor by floating a scum from the liquor.

A more particular object is the provision of a method for reducing the quantity of suspended foreign matter (turbidity) present in defecated sugar liquor after the defecated liquor has been clarified by scum flotation.

Still another important object is the provision of a method for clarifying defecated sugar liquors which also brings about an appreciable lightening of the color of the liquor.

Yet another object is the provision of a method for clarifying defecated sugar liquor by flotation, which method can, if desired, be carried out with simple mechanically agitated vessels and obviates the need for the complex air impregnation systems required in prior art methods for the clarification of defecated sugar liquors by scum flotation.

Still another object of this invention is the provision of a method for simultaneously clarifying and decolorizing defecated sugar liquor which can be carried out with carbon dioxide gas as the scum flotation agent.

A further object of the invention is the provision of a novel method for clarifying defecated sugar liquors whereby the clarified liquor can be charged directly to the decolorizing adsorbent without undergoing the conventional polishing step.

Futher objects and advantages will be readily apparent from a description of the invention which follows.

This invention results from the surprising and unexpected discovery that defecated sugar liquors can be clarified to a noteworthy extent simultaneously while effecting spectacular color removal when scum flotation is carried out in the presence of an extremely small quantity of a type of organic compound, hereinafter set forth. An embodiment of the invention stems from the further discovery that when said organic compound is employed in the clarification process, clarification can be carried out in simplified equipment which would be unsuitable in the absence of the organic additive.

Stated briefly, in accordance with this invention, defecated raw sugar liquor containing suspended impurities and dissolved color impurities, especially sugar liquor defecated with phosphoric acid and lime, is clarified by mixing an extremely small quantity of an organic amine, preferably a salt of a higher fatty amine, into the defecated liquor, incorporating a multiplicity of finely divided gas bubbles into the liquor containing amine at elevated temperature, maintaining the gas filled liquor quiescent at elevated temperature, and withdrawing from the top of the liquor a dark scum which is a concentrate of defecating agent with enmeshed impurities originally in the defecated liquor as well as color bodies originally in the defecated liquor, leaving a clarified and decolorized sugar liquor as a residue.

Sugar liquors clarified with addition of small amounts of organic amine, in accordance with this invention, compare favorably in clarity (viz., absence of turbid matter) with liquors that have been clarified commercially by impregnation with pressurized air. Moreover, liquors clarified in accordance with this invention are appreciably lighter in color than either refinery clarified liquors or refinery clarified liquors that have also been polished. As a result, more effective use can be made of the costly adsorbents used to decolorize clarified liquor solutions.

This is true even when the clarification process of the invention is employed without a polishing step since smaller quantities or color bodies must be adsorbed by the decolorant when the liquor is clarified with an amine additive. If desired, liquors clarified by the process of this invention can be polished before decolorization. However, the polishing of the clarified liquor can be carried out at much higher flow rates than could be employed with commercially clarified liquors because of the appreciably lower content of suspended impurities in the liquors that have been clarified in accordance with this invention.

In accordance with one embodiment of this invention, air bubbles are incorporated into the defecated liquor after addition of amine by the simple expedient of stirring the heated liquor at high speed. This can be accomplished in a vessel containing an impeller agitator, such as an impeller agitated vessel of the type employed to condition ores for froth flotation. It was surprising and unexpected that clarification and color removal could be effected by mere high speed agitation of the liquor because the prior art teaches the necessity for using complicated nozzle systems or other pressurized air systems in the scum flotation method for clarifying defecated sugar liquors. See Spencer and Meade's Cane Sugar Handbook, eighth edition, page 303 (1957).

It was also surprising that exceptionally good results could be obtained in the process when carbon dioxide was used as the impregnating gas since carbonation of defecated sugar liquids in the absence of organic amine additive is very ineffective in bringing about clarification of defecated sugar liquors by scum flotation.

The amines employed in carrying out this invention must have low volatility at clarification temperatures (which are typically of the order of 140–180° F.). They must also resist amidification at these temperatures since the desired results are not obtained with organic amides. The use of higher fatty acid ($C_8$ to $C_{18}$) amines or mixtures of higher fatty amines is preferred. Especially good results have been obtained with $C_{18}$ amines which appear to be somewhat superior to other fatty amines. Primary fatty amines are available commercially in distilled, undistilled, and/or still bottom grades and are obtained from tall oil fatty acids, caprylic, capric, lauric, myristic, palmitic and stearic acids and also from mixed acids obtained from soybean oil, coconut oil, tallow and hydrogenated tallow. Fatty acid amines are usually produced by catalytic hydrogenation of fatty acid nitriles at about 150° C.; these nitriles in turn are produced by reaction of ammonia with a higher fatty acid or a mixture of such acids. The catalytic hydrogenation product generally comprises about 85 percent primary amine, with the balance secondary amines and minor quantities of tertiary amines. Secondary fatty amines are prepared in the same way except that catalytic hydrogenation is carried out at a higher temperature. The amines may be used as free bases, as salts of inorganic acids (e.g., sulfuric, phosphoric, hydrochloric) or as salts of organic acids (e.g., acetic, formic, stearic, lactic, maleic, butyric, caproic). Superior results are obtained with water-solubilized amines, such as the acetate salt of an amine. Especially recommended are water-soluble (including water-dispersible) salts of fatty amines containing from 8 to 18 carbon atoms, such as the acetate salt of the n-primary fatty amine derived from tallow. Amines of resin acids, such as dehydroabietyl amine, are generally similar to amines of higher fatty acids and should be as satisfactory as the higher fatty acid amines. Other organic amines include liquid or solid aliphatic, aromatic, aralkyl, alicyclic and heterocyclic amines, as well as alkylolamines and quaternary ammonium compounds. As examples of such amines may be mentioned: pyridine, dodecylamine, quinoline, ethanolamines, alkylene polyamines such as diethylenetriamine, cetylpyridium ammonium chloride, dimethyldioctadecyl ammonium acetate, morpholine, imidazolines such as heptadecenyl-imidazoline, amido-amines such as those obtained by condensation of ethylene diamine and higher fatty acids, and N-aliphatic alkylene polyamines such as N-tallow trimethylene diamine.

Employing the preferred water-soluble (or water-dispersible) salts of $C_8$ to $C_{18}$ fatty amines, it is preferable to dissolve or to disperse the amine salt in a liquid vehicle before incorporating the amine salt into the sugar liquor. Preferably the water-soluble or water-dispersible amine is dissolved or dispersed in a water-soluble volatile organic solvent, such as alcohol, before the amine salt is incorporated into the defecated sugar liquor since the amine salt appears to be more effective when a vehicle such as alcohol is employed rather than an aqueous vehicle. Moreover, use of the organic vehicle avoids undesirable dilution of sugar liquor which would occur with an aqueous vehicle. Alcohol solutions containing 5% to 40% amine acetate salt have been used with success.

The organic amine is employed in amount which is typically within the range of about 0.1 to 2.0 pounds per ton of sugar solids in the defecated sugar liquor. When amine is employed in amount less than about 0.1 pound per ton of sugar solids, its effect on the color of the liquor may not be significant. The amine appears to be less effective in reducing turbidity of the defecated liquid when employed in amount in excess of 1.0 pound per ton of sugar solids than when smaller quantities of amine are employed. Optimum quantity of amine reagent will be expected to vary with the turbidity and color of the defecated sugar liquir and can be determined by simple experiment.

If desired, finely divided nonporous solid particles can also be incorporated into the sugar liquid together with the organic amine to aid in the scum flotation of the suspended particles present in sugar liquor. These particles, which are preferably minus 325 mesh (44 microns) in size, can be any mineral or synthetic material which, when mixed with organic amine, acquires an air-avid coating so that the amine coated particles report in the scum along with finely divided solids originally present in the defecated sugar liquid. The added mineral particles should be nonporous to prevent excessive consumption of amine by absorption into the added mineral particles. Therefore, solids having a low surface area, e.g., calcite, barytes, are preferable to high surface area solids, such as industrial adsorbents.

The clarification process of this invention is especially applicable to the treatment of defecated raw sugar liquors although it could be applied to defecated raw washings when commercially feasible. These sugar liquors can contain about the same quantity of sugar solids and be of about the same purity as sugar liquors that are defecated and clarified in industrial refineries. The liquors typically have a density of about 62° Brix before defecation.

In putting the process into practice, the impure sugar liquor is defecated with phosphoric acid and lime at elevated temperature, as described in Cane Sugar Handbook, eighth edition, pages 295–297 (1957). Defecation is conveniently carried out in a "blowup," a circular tank having a conical bottom and fitted with steam coils and mechanical stirring equipment.

The organic amine (preferably in the form of an alcohol solution of a water-soluble amine salt) is incorporated into the defecated liquor and uniformly mixed therewith before the liquor is subjected to clarification. The amine can be incorporated into the defecated liquor before cooling, in which case the liquor will be at a temperature typically in the range of about 140° F. to about 180° F. It is also within the scope of this invention to incorporate the amine into the defecated liquor after the liquor has cooled. Light stirring will suffice to mix the amine into the liquor when the amine or amine salt is in the form of a solution or emulsion. As mentioned, clarification can be brought about by agitating the liquor with amine additive at elevated temperature (e.g., 140–180° F.) in a high speed mixer provided with impeller agitation. Agitation of the amine in the defecated liquor is continued until the liquor appears creamy and emulsified. The emulsified mixture is maintained quiescent at an elevated temperature which can be somewhat above the temperature at which the liquor was emulsified. The surface scum is then mechanically removed from the liquor. A Fagergren or other flotation cell provided with means for heating the liquor can be employed for emulsifying the liquor and for removing the scum from the emulsified liquor.

Alternatively, the amine treated liquor can be impregnated with air by means of nozzle ejector systems of the type presently used for scum flotation. By way of example, the liquor containing amine can be ejected through small nozzles under pressure onto rotating discs whereby the ejected liquor aspirates air from the atmosphere. The air impregnated liquor is then fed to clarifying boxes of the type presently employed in refineries. Surface scum is removed from the box in the usual manner and clarified liquor withdrawn adjacent the bottom of the box, as described in Cane Sugar Handbook, pages 303–304.

As mentioned hereinabove, the clarification process of this invention is not limited to the use of air as the gaseous agent to levitate impurities in the sugar liquor since carbon dioxide gas can also be used for the purpose. Carbonation of an amine treated defecated sugar liquor has resulted in exceptionally good clarification and color removal. This result was not realized when the carbon dioxide was used without a preliminary amine treatment of the defecated liquor. In carrying out this form of the invention, carbon dioxide gas is impregnated into the amine treated defecated sugar liquor at elevated temperature, e.g., 170° F., until the liquor appears creamy. The temperature of the liquor is then increased, as to about 180° F. and the heated liquor maintained quiescent to permit scum to form.

Liquor clarified and decolorized in accordance with this invention can be treated for further removal of colored impurities in the usual manner, i.e., by char filtration. However, color body adsorbents other than char can be used to decolorize the clarified liquor. Any residual amine in the liquor can be removed by the decolorizing adsorbent.

The following examples are given to illustrate the benefits of incorporating an organic amine into defecated sugar liquor before clarifying the liquor by scum flotation.

In the examples the sugar liquor was a washed sugar liquor from a refinery. The sugar solids content of the liquor was 64%. In accordance with the practice of the refinery from which the liquor was obtained, the liquor was defecated by heating the liquor to 180° F., adding 75% $H_3PO_4$ to the liquor in amount equivalent to 0.015 to 0.020% $P_2O_5$, based on the sugar solids in solution. Unslaked lime was added to bring the phosphoric acid treated liquor to a pH of 7.0 to 7.5.

EXAMPLE I

In accordance with the subject invention, a defecated washed sugar liquor was clarified and decolorized simultaneously by dissolving an amine salt in the defecated liquor, subjecting the heated amine conditioned liquor to high speed mechanical agitation to aerate the liquor and floating a scum. Color and turbidity of defecated liquor clarified and decolorized in this manner were compared with the color and turbidity of mechanically agitated defecated liquor without amine addition in order to demonstrate the necessity for conditioning the defecated liquor with amine before aerating the liquor by mechanical stirring. Also compared were the properties of the same sugar liquid after phosphoric acid-lime defecation and refinery clarification by scum flotation (without amine treatment) using a nozzle ejector system to impregnate the liquor with air bubbles. The properties of the refinery clarified liquor after refinery polishing were also evaluated.

Isopropyl alcohol solutions of the acetate salt of the amine derived from tallow fatty acids (Armac T) were added to portions of the freshly defecated liquor and the sugar liquors were heated to 170° F. The heated liquors containing amine additive were agitated in a malted milk type mixer carrying a single shaft with a corrugated disc propeller (Hamilton Beach, Model 40DM). The mixer was operated at 14,000 r.p.m. for 2 minutes. The agitated liquors were poured into containers which were allowed to stand for 40 minutes in a water bath maintained at 180° F. The scum floating on top of the liquors was scraped off and turbidity measurements made of the clarified liquors with the Nepho-Colorimeter. To get an indication of color change during clarification, Klett-Sommerson colorimetry, which determines both color and turbidity, was employed in conjunction with nephelometry. Combined color and turbidity vary inversely with Klett-Sommerson reading. (No readings were made on the defecated liquor before clarification because of the highly turbid nature of the defecated liquor before clarification.) Results are summarized in Table I.

Table I

CLARIFICATION OF WASHED DEFECATED SUGAR LIQUORS—AERATION BY HIGH SPEED MECHANICAL STIRRING

| Treatment of Defecated Liquor | Turbidity of Treated Liquor— Nepho Reading | Color and Turbidity of Treated Liquor— Klett-Sommerson Reading | Color of Treated Liquor— Klett Reading Minus Nepho Reading |
|---|---|---|---|
| Refinery clarified | 130 | 340 | 210 |
| Refinery clarified and polished | 7 | 204 | 197 |
| Liquors clarified by high speed agitation: | | | |
| Additive [1]— | | | |
| None | 25 | 335 | 310 |
| 0.20 #/ton Armac T as 20% alcohol solution | 37 | 288 | 251 |
| 0.40 #/ton Armac T as 20% alcohol solution | 45 | 252 | 207 |
| 0.60 #/ton Armac T as 20% alcohol solution | 42 | 190 | 148 |
| 0.80 #/ton Armac T as 20% alcohol solution | 50 | 164 | 114 |

[1] Reagents reported on basis of sugar solids in liquor.

Data in Table I show that defecated liquor that was clarified in accordance with this invention by incorporation of 0.20 to 0.80 pound per ton $C_{18}$ amine acetate salt and then mechanically agitated at high speed had turbidity readings (Nepho) of 37 to 50 as compared with a high turbidity reading of 130 for the commercially clarified liquor. These data therefore indicate that more suspended impurities were removed when the liquor was clarified in accordance with this invention than when the liquor was clarified by the commercial process.

The Klett-Sommerson readings in Table I for liquor clarified with 0.20 to 0.80 pound per ton amine acetate addition and mechanical agitation were appreciably lower than the Klett-Sommerson reading for the commercially clarified liquor, indicating that the liquors processed in accordance with this invention had less combined turbidity and color matter than the commercially clarified liquor. Since turbidity accounted at least in part for the high Klett-Sommerson reading for the commercially clarified liquor, it could not be ascertained with certainty whether more color removal was accomplished with 0.20 and 0.40 pound per ton amine acetate addition than in the commercial process. However, in the case of clarification with 0.60 and 0.80 pound per ton of amine salt addition, Klett-Sommerson readings were appreciably lower than the Klett-Sommerson readings for refinery clarified liquors. Since the Klett-Somerson readings for liquors clarified with 0.60 and 0.80 pound per ton of amine salt were lower than the Klett-Sommerson readings for the substantially nonturbid polished refinery clarified liquor, the data indicate that the refinery clarified liquor, even after polishing, contained appreciably more solubilized color matter than the liquors clarified with 0.60 and 0.80 pound per ton amine acetate. Visual observation of the liquors clearly indicated that more coloring matter had been removed with 0.60 and 0.80 pound per ton amine acetate addition and mechanical stirring than in refinery clarification followed by polishing.

A comparison of data for clarification with aeration by high speed agitation with and without amine acetate addition indicates that while somewhat less turbid matter may have been removed from defecated liquor with the amine treatment, nevertheless the presence of amine was essential in order to achieve color reduction simultaneously with removal of turbidity. A comparison of the data for the run with aeration by high speed agitation without amine salt addition with data for refinery clarified liquor shows that the Klett-Sommerson readings for the two clarified liquors were similar. However, since the refinery clarified liquor was obviously more turbid than the liquor clarified with high speed mechanical agitation (note the nephelometer readings), it can reasonably be concluded that appreciably less colored matter was removed by aerating the liquor with high speed mechanical agitation than in the commercial nozzle aeration system. The data therefore indicate that it is essential to incorporate an amine into the defecated sugar liquor before it is aerated by mechanical stirring in order to bring about color removal comparable with that achieved in the refinery clarification process.

EXAMPLE II

This example illustrates the advantage of employing a higher fatty amine clarification aid in the form of a water-dispersible salt rather than as a free base and further illustrates the advantage of employing the salt in the form of an alcoholic solution rather than in the form of an aqueous solution.

Portions of the lime-phosphoric acid defecated sugar liquor of Example I were heated to 170° F. and stirred for two minutes with or without additives listed in Table II. The stirred liquors were then transferred to the Hamilton Beach mixer and agitated for two minutes. The agitated liquors were allowed to stand in a graduate immersed in a water bath maintained at 180° F. for 40 minutes. After standing, floating scum was removed from each liquor and turbidity readings were made on the clarified liquors using a Nepho-Colorimeter. Visual observation of color removal was also recorded. Results are summarized in Table II.

*Table II*

EFFECT OF AMINE ADDITION ON CLARIFICATION OF DEFECATED SUGAR LIQUOR—AERATION BY MECHANICAL STIRRING

| Additive | Nepho Reading | Visual Color Removal |
|---|---|---|
| No additive | 39 | Poor. |
| 1.0 #/ton $C_8$ primary amine acetate salt [1] as 5% aqueous solution. | 61 | Good. |
| 1.0 #/ton $C_{12}$ primary amine acetate salt [2] as 5% aqueous solution. | 78 | Very good. |
| 1.0 #/ton $C_{18}$ primary amine acetate salt [3] as 5% aqueous solution. | 53 | Do. |
| 1.0 #/ton $C_{18}$ primary amine acetate salt [3] as 10% solution is isopropyl alcohol. | 41 | Excellent. |
| 1.0 #/ton $C_{18}$ primary amine [3] (free base) as 5% aqueous emulsion. | 84 | Good. |

[1] Octylamine.
[2] Dodecylamine.
[3] Amine from tallow fatty acids.

Data in Table II show that the pretreatment of defecated liquor with amine as a free base or as a salt was essential to decolorize the defecated liquor simultaneously while removing turbid matter. The data also show that optimum color removal and reduction in turbidity was realized by using a fatty amine salt that was dissolved in isopropyl alcohol before being incorporated into the defecated liquor. When the same amine salt was dissolved in water before being incorporated into the liquor, color removal was not as noteworthy as when the amine was solubilized in the organic solvent. Further, the Nepho reading of the liquor clarified with amine salt dissolved in the alcohol was 41 as compared with a Nepho reading of 53 for the liquor clarified with amine salt dissolved in water, indicating that somewhat more suspended matter was removed when the organic solvent was used.

The data in Table II also indicate that an 18 carbon atom primary fatty amine salt was superior in bringing about color removal and reducing turbidity than the salt of an 8 carbon atom primary amine or the salt of a 12 carbon atom primary fatty amine.

All of the amine salts were more effective in reducing turbidity than amine employed as the free base and the amine salts, with the exception of the salt of the 8 carbon atom amine, were markedly superior to the free base in bringing about color removal at an accepable level of removal of suspended matter.

EXAMPLE III

This example illustrates the benefits of incorporating a water dispersible amine salt into defecated sugar liquor before it is aerated with a nozzle system. The example illustrates also that the benefits attained by the incorporation of the amine are not realized when other water dispersible surface active agents are substituted for the cationic amine acetate salt.

Charges of the defecated sugar liquor at 170° F. were stirred with or without additives. The stirred liquor was charged into a bomb and the bomb pressurized with air and then atomized through a nozzle into a container. The container with liquor was allowed to stand at 180° F. in water bath for 40 minutes and the scum which formed on the surface of the liquor was removed by a siphon system. Turbidity measurements of the clarified liquor were made on the Nepho-Colorimeter with the results summarized in Table III.

*Table III*

EFFECT OF ADDITIVES ON CLARIFICATION OF DEFECATED SUGAR LIQUOR—AERATION BY NOZZLE EJECTOR SYSTEM.

| Additive | Nepho Reading | Visual Color Removal |
|---|---|---|
| No additive | 40 | Poor. |
| 1.0 #/ton acetate salt of $C_{18}$ primary amine (Armac T) | 84 | Good. |
| 1.0 #/ton coconut fatty acid diethanolamide (Monamid 150CE) | 98 | Poor. |
| 1.2 #/ton 50% mineral oil solution of calcium salt of petroleum sulfonate (Calcium Petronate) | 114 | Do. |

A comparison of the effect of three different types of surface active agents on the clarification of aerated defecated sugar liquor indicates that only the amine was effective in promoting color removal. Liquors clarified with fatty amide or with petroleum sulfonate were more turbid than the liquor clarified with amine.

EXAMPLE IV

Experiments were conducted to demonstrate that when defecated sugar liquor is treated with an organic amine salt the defecated liquor can be clarified and also decolorized by scum flotation using carbon dioxide gas.

The procedure of Example III was repeated with pressurized carbon dioxide gas being substituted for the pressurized air. Results for scum flotation of the defecated liquor by carbonation are given in Table IV. These data show that in order to remove turbid matter from the defecated liquor at a high level of color removal with carbon dioxide gas it was necessary to incorporate an amine salt into the defecated liquor before gassing the liquor with carbon dioxide.

*Table IV*

EFFECT OF AMINE ADDITIVE ON CLARIFICATION OF DEFECATED SUGAR LIQUOR GASSED BY CARBONATION

| Additive | Nepho Reading | Visual Color Removal |
|---|---|---|
| No additive | 39 | Very poor. |
| 1.0 #/ton acetate salt of $C_{18}$ primary amine (Armac T). | 55 | Very good. |

I claim:

1. A method for decolorizing defecated sugar liquor simultaneously while removing matter suspended therein which comprises adding a small amount of an organic amine into defecated sugar liquor, incorporating a multiplicity of finely divided gas bubbles throughout said liquor containing organic amine at elevated temperature, maintaining said liquor containing organic amine quiescent at elevated temperature, whereby defecating material with occluded solid impurities originally in said liquor rise to the surface of said liquor and form a scum, and separating the scum from the liquor, leaving as a residue clarified liquor of lighter color than the starting liquor.

2. The method of claim 1 in which said organic amine is employed in amount within the range of about 0.1 to 2.0 pounds per ton of sugar solids in said sugar liquor.

3. The method of claim 1 in which said organic amine is incorporated in the form of a water-soluble amine salt.

4. The method of claim 1 in which said organic amine is a primary fatty amine containing 8 to 18 carbon atoms.

5. The method of claim 1 in which said organic amine is a water-soluble salt of a primary fatty amine containing from 8 to 18 carbon atoms.

6. The method of claim 1 in which said organic amine is the acetate salt of a primary fatty amine containing 18 carbon atoms.

7. The method of claim 1 in which said gas is air.

8. The method of claim 7 in which air bubbles are incorporated into said liquor by stirring said liquor with amine at high speed until said liquor has a creamy appearance.

9. The method of claim 1 in which said gas is carbon dioxide.

10. A method for decolorizing and simultaneously clarifying impure sugar liquor to which phosphoric acid and lime have been added to form in situ a flocculent calcium phosphate precipitate which comprises: mixing a small amount of an organic amine into said liquor containing flocculent calcium phosphate precipitate, incorporating a multiplicity of finely divided gas bubbles into said liquor at elevated temperature, maintaining said liquor quiescent at elevated temperature, whereby said flocculent calcium phosphate precipitate with occluded impurities originally in said liquor rises to the surface of said liquor and forms a scum, and separating the scum from the remainder of the liquor which is a sugar liquor of improved clarity, the amount of said amine that is incorporated into said liquor being sufficient to lighten significantly the color of the clarified liquor.

11. The method of claim 10 in which said organic amine is an acetate salt of a primary fatty amine containing 8 to 18 carbon atoms and said salt is incorporated into said sugar liquor in the form of an isopropyl alcohol solution.

12. A method for clarifying and simultaneously decolorizing impure sugar liquor to which phosphoric acid and lime have been added to form in situ a flocculent calcium phosphate precipitate which comprises: mixing into said liquor containing flocculent calcium phosphate precipitate a small amount of a water-soluble salt of a primary fatty amine containing 8 to 18 carbon atoms, said amine salt being dissolved in a water-soluble organic solvent, impregnating said liquor containing organic amine with a multiplicity of finely divided air bubbles, maintaining the air impregnated liquor quiescent at elevated temperature whereby said flocculent calcium phosphate precipitate with occluded impurities originally in said liquor rises to the surface of said liquor and forms a scum, and separating the scum from the remainder of the liquor which is a sugar liquor of improved clarity, the amount of said amine salt that is incorporated into said liquor being sufficient to lighten significantly the color of said liquor.

13. The method of claim 12 in which said amine salt is the acetate salt of a mixture of primary fatty amines consisting predominantly of amines containing 18 carbon atoms and said organic solvent is isopropyl alcohol.

14. The method of claim 12 in which air bubbles are incorporated into said liquor by agitating the liquor with an impeller agitator.

15. A process for purifying washed impure sugar liquor which comprises:
   (1) defecating said liquor
   (2) without clarifying the defecated liquor, incorporating a small amount of organic amine therein,
   (3) impregnating said defecated liquor containing organic amine at elevated temperature with a multiplicity of finely divided gas bubbles,
   (4) maintaining the impregnated liquor quiescent at elevated temperature, whereby a scum comprising defecating material with occluded impurities originally in the sugar liquor forms on the surface of said liquor,
   (5) separating the scum from the remainder of the liquor which is a sugar liquor of improved clarity and lighter color,
   (6) and, without filtering the sugar liquor, contacting the liquor with a decolorizing agent, thereby to remove residual color matter from the liquor.

References Cited in the file of this patent

UNITED STATES PATENTS

| 1,967,310 | Kent | July 24, 1934 |
| 2,518,296 | Eguchi et al. | Aug. 8, 1950 |
| 2,578,040 | Booth et al. | Dec. 11, 1951 |
| 2,628,827 | Daman | Feb. 17, 1953 |
| 2,776,229 | Peterson | Jan. 1, 1957 |
| 2,964,428 | Delfos | Dec. 13, 1960 |

FOREIGN PATENTS

| 231,430 | Great Britain | Mar. 30, 1926 |

OTHER REFERENCES

Hansen et al.; Sewage Treatment by Flotation, Sewage Works J., vol. 1, March 1943, pp. 242–252.